Figure 1:
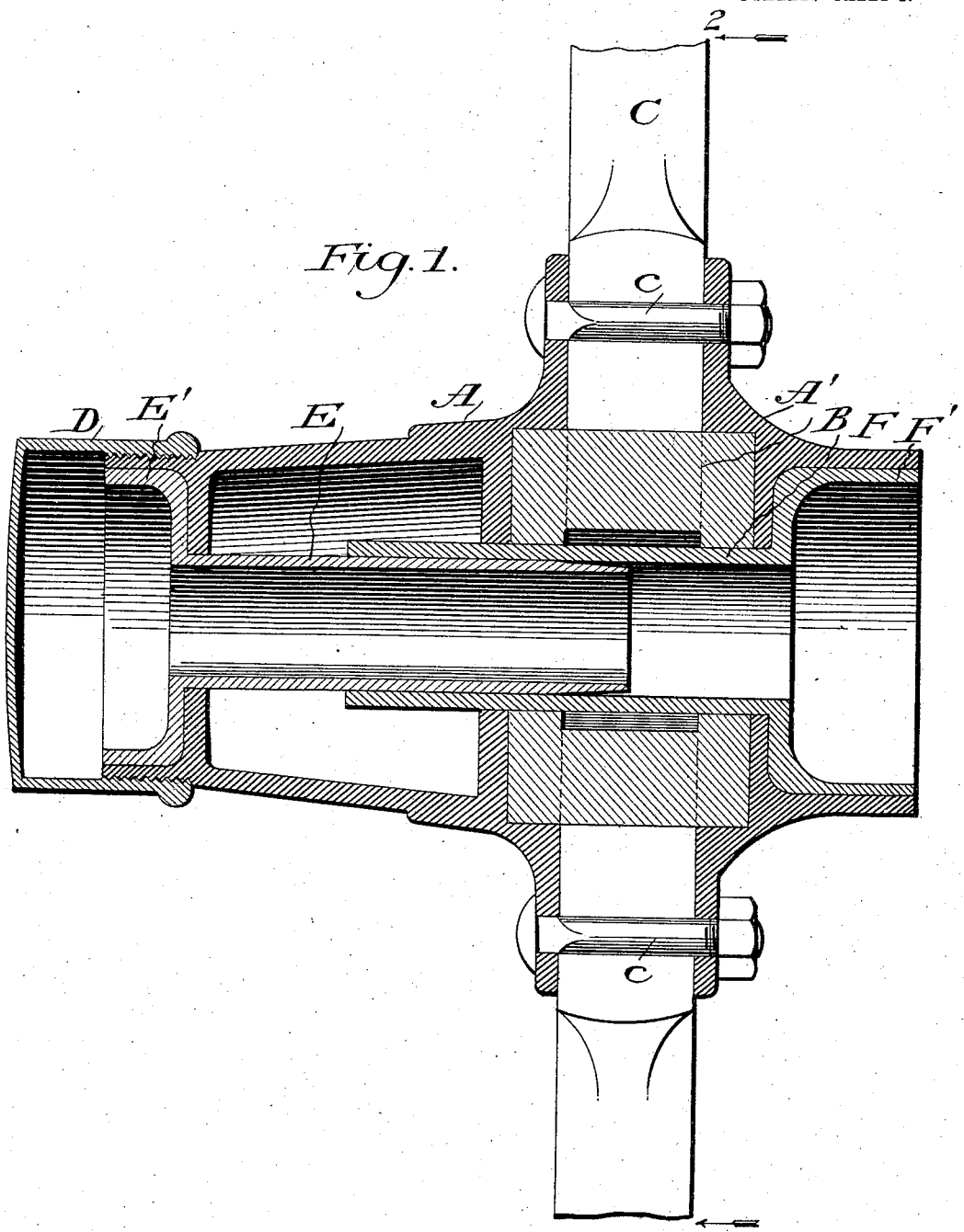

No. 787,564. PATENTED APR. 18, 1905.
J. C. COUPER.
WHEEL.
APPLICATION FILED OCT. 24, 1903.

2 SHEETS—SHEET 2.

Witnesses:
Otis A. Earl
Ethel A. Teller

Inventor:
James C. Couper
By Fred L. Chappell,
Atty.

No. 787,564.

Patented April 18, 1905.

UNITED STATES PATENT OFFICE.

JAMES C. COUPER, OF FLINT, MICHIGAN, ASSIGNOR TO THE IMPERIAL WHEEL COMPANY, OF FLINT, MICHIGAN.

WHEEL.

SPECIFICATION forming part of Letters Patent No. 787,564, dated April 18, 1905.

Application filed October 24, 1903. Serial No. 178,394.

*To all whom it may concern:*

Be it known that I, JAMES C. COUPER, a citizen of the United States, residing at the city of Flint, in the county of Genesee and State of Michigan, have invented certain new and useful Improvements in Wheels, of which the following is a specification.

This invention relates to improvements in wheels. It has to do more particularly with the hub structure.

A very successful wheel for very heavy work, with the minimum size, is the "Archibald" wheel. This is a wheel in which the spokes are securely clamped between metal flanges, which flanges constitute the entire hub. This wheel is quite difficult to manufacture, and unless perfectly constructed the spokes will work loose, and the wheel as a consequence lacks stability. Another kind of wheel which has been much in use is known as the "Sarven" wheel. The hub of this wheel is constructed of wood, with an exterior shell of metal crowded over the same like a sleeve or jacket and secured to the spokes by flanges embracing the same and secured thereto by suitable rivets or bolts. Such wheels are somewhat objectionable because of the difference in expansion and contraction between the metal shell and the wood centers, requiring care in the manufacture to secure the best results, though they have the advantage of a wood center. Such wheels, with wood hubs the entire length, are also objectionable on account of its being necessary to cut out so much of the wood part of the hubs to admit of the sleeves and cups for the ball or roller bearings, thus weakening the hubs to such an extent as to make them unsatisfactory for such work.

It is the object of this invention to secure all of the advantages of both of these styles of wheels and to eliminate the disadvantages of each, thereby producing a wheel of superior strength that can be readily manufactured.

The objects are in detail, first, to provide improved means of retaining the spokes in a wheel of this class; second, to provide an improved flange construction in a wheel of this class; third, to provide improved sleeves and ball-races in a wheel of this class; fourth, to provide a wheel of superior strength when its dimensions are taken into consideration.

Further objects relating to the details of construction will appear in the description to follow.

I accomplish the objects of my invention by the devices and means described in the following specification.

The invention is clearly defined and pointed out in the claims.

A structure embodying the features of my invention is fully illustrated in the accompanying drawings, forming a part of this specification, in which—

Figure 2:
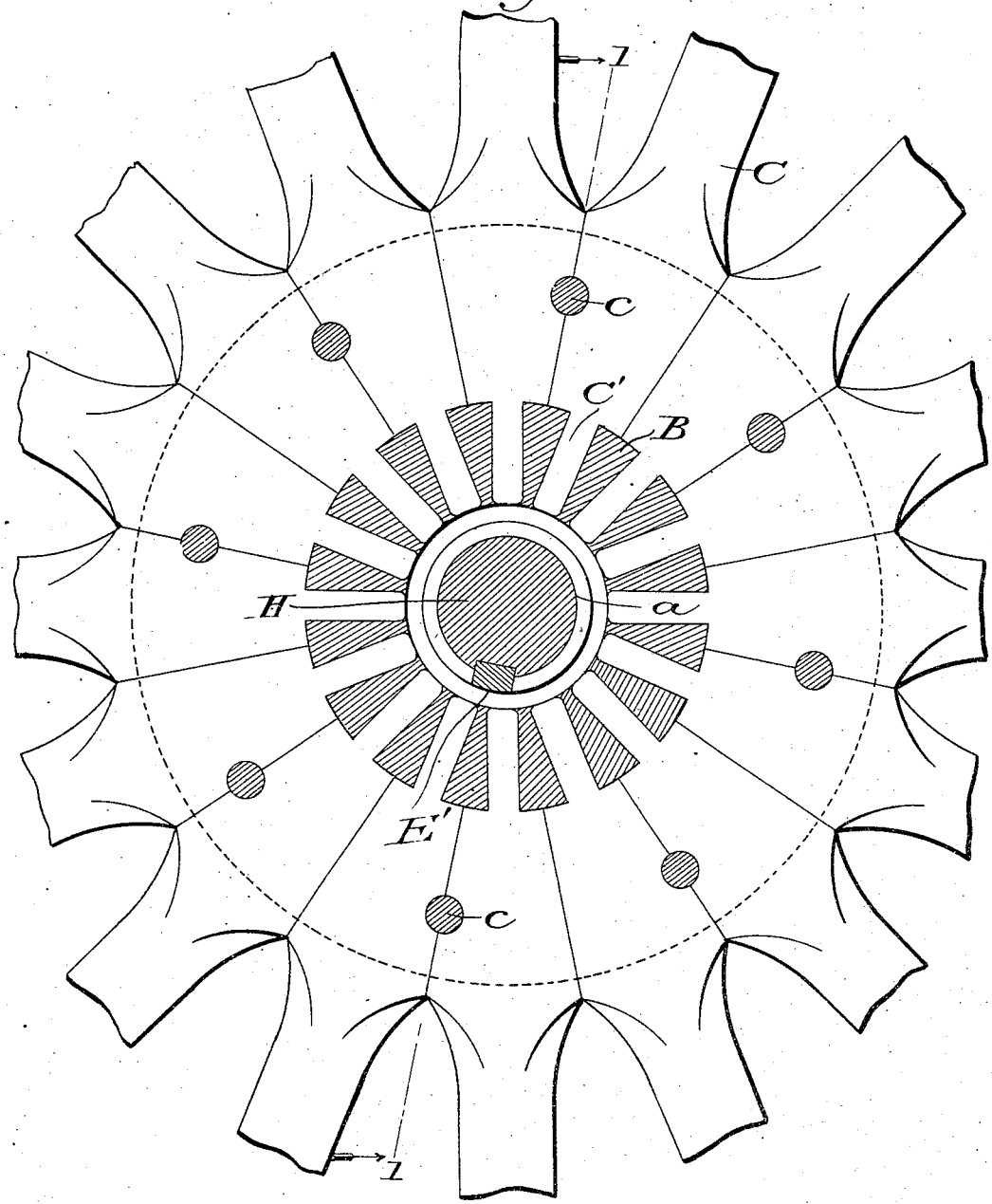

Figure 1 is a central longitudinal sectional view taken on a line corresponding to line 1 1 of Fig. 2. Fig. 2 is a transverse detail sectional view taken on a line corresponding to line 2 2 of Fig. 1.

In the drawings the sectional views are taken looking in the direction of the little arrows at the ends of the section lines, and similar letters of reference refer to similar parts throughout both views.

Referring to the drawings, the hub is made up of a front or outside flange and sleeve A and a rear or inside flange and sleeve A', embracing the hub-block B and the mitered spokes C. A central recess is formed in the flanges to receive the hub-block B. The spokes C are mortised into this hub-block B and are mitered together outside the hub and fit closely together at a point somewhat beyond the flange. The hub-block serves as a temporary support for the spokes in the construction of the wheel and when the wheel is completed serves the important function of cushioning the spokes. The shoulders of the spoke-tenons rest against the block and prevent the spokes from bending inward, thus effecting the said cushioning.

The projecting ends of the hub-blocks fit snugly at their peripheries within the recess in the flanges, but do not exert any considerable pressure at their ends, as that would interfere with the proper clamping of the flanges upon the sides of the spokes adjacent to the hub-block. Bolts or rivets *c*, extending through the flanges A A' and the spokes, clamp them securely onto the sides thereof, thereby serving to retain them in position and affording a broad bearing by which the ends of the spokes next the hub are embraced and their displacement prevented. The flanges and the remaining parts are kept concentric by sleeve-like boxings E F, which are telescoped together, suitable ball recesses or cups E' F' being formed thereon and fitted within the projecting rims of the flanges A A', extending in position and serving the function of a point-band and hub-band of the ordinary wheel.

As the outer boxing F fits snugly the hole through the flanges and through the hub-block B, the parts are all retained effectively in position. A cap D is preferably provided for the outer end of the hub. The interior parts of the metallic portion of the hub are cored out to make them as light as possible for the required strength.

While I have shown my improved wheel structure especially adapted to ball-bearings, I desire to remark that so far as the supporting of the spokes and the flanging is concerned it may be adapted to a great variety of wheels. While inserting the boxing tight within the flanges and the hub secures perfect alinement, it is obvious that this particular function of the boxing might be eliminated and the structure still be a satisfactory wheel. Therefore I desire to remark that it is my purpose to claim the particular wheel structure with the particular boxings shown, and I also wish to claim the structure, no matter what style of boxing may be used or how it may be supported. I believe that I have shown the structure in its most satisfactory form. I desire to remark, further, that under certain conditions it may be found desirable to further divide the parts and reassemble them together, or it may be found of advantage to make the boxing integral with the flanges or some other part and not separable, as it is shown in the drawings.

Having thus described my invention, what I claim as new, and desire to secure by Letters Patent, is—

1. In a wheel structure, the combination of a short central hub-block B; mitered spokes C mortised thereinto; a front flange A with suitable hub front extension; a rear flange A' with suitable hub rear extension, said flanges being recessed toward the center to embrace the hub-block, and clamped upon the sides of the spokes by suitable bolts or rivets c; a boxing F with a ball-cup F' at its inner end; a boxing E sleeved into said boxing F, with a ball-race E' at its outer end, said boxes being fitted snugly into the center bore through said flanges and the hub-block, all coacting substantially as described and for the purpose specified.

2. In a wheel structure, the combination of a short central hub-block; mitered spokes mortised thereinto; a front flange with suitable hub front extension; a rear flange with suitable hub rear extension, said flanges being recessed toward the center to embrace the hub-block, and clamped upon the sides of the spokes by suitable bolts or rivets; a boxing F; a boxing E sleeved into said boxing F, said boxings being fitted into the center bore through said flanges and the hub-block, substantially as described.

3. In a wheel structure, the combination of a short central hub-block; mitered spokes mortised thereinto; a front flange; a rear flange, said flanges being recessed toward the center to embrace the hub-block, and clamped upon the sides of the spokes by suitable means; a boxing F; a boxing E sleeved into said boxing F, said boxings being fitted into the center bore through said flanges and the hub-block, substantially as described.

4. In a wheel structure, the combination of a short central hub-block; mitered spokes mortised thereinto; a front flange; a rear flange, said flanges being recessed toward the center to embrace the hub-block, and clamped upon the sides of the spokes by suitable bolts therethrough; a boxing, said boxing being fitted into a center bore through said flanges and the hub-block.

5. In a wheel structure, the combination of a short central hub-block; mitered spokes mortised thereinto; a front flange with suitable hub front extension; a rear flange with suitable hub rear extension, said flanges being recessed toward the center to embrace the hub-block, and clamped upon the sides of the spokes by suitable bolts therethrough; a boxing, said boxing being fitted into a center bore through said flanges, and the hub-block.

6. In a wheel structure, the combination of a short central hub-block; mitered spokes mortised thereinto; a front flange with suitable hub front extension; a rear flange with suitable hub rear extension, said flanges being recessed toward the center to embrace the hub-block, and clamped upon the sides of the spokes by suitable bolts therethrough.

7. In a wheel structure, the combination of a short central hub-block; mitered spokes mortised thereinto; a front flange; a rear flange, said flanges being recessed toward the center to embrace the hub-block, and clamped upon the sides of the spokes by suitable bolts therethrough.

In witness whereof I have hereunto set my hand and seal in the presence of two witnesses.

JAMES C. COUPER. [L. S.]

Witnesses:
C. A. DURAND,
ARTHUR V. SOMERS.